Nov. 4, 1924.                                                                1,513,774
                            H. R. TRAPHAGEN
                            SIDE DELIVERY RAKE
                      Filed March 28, 1922            2 Sheets-Sheet 1
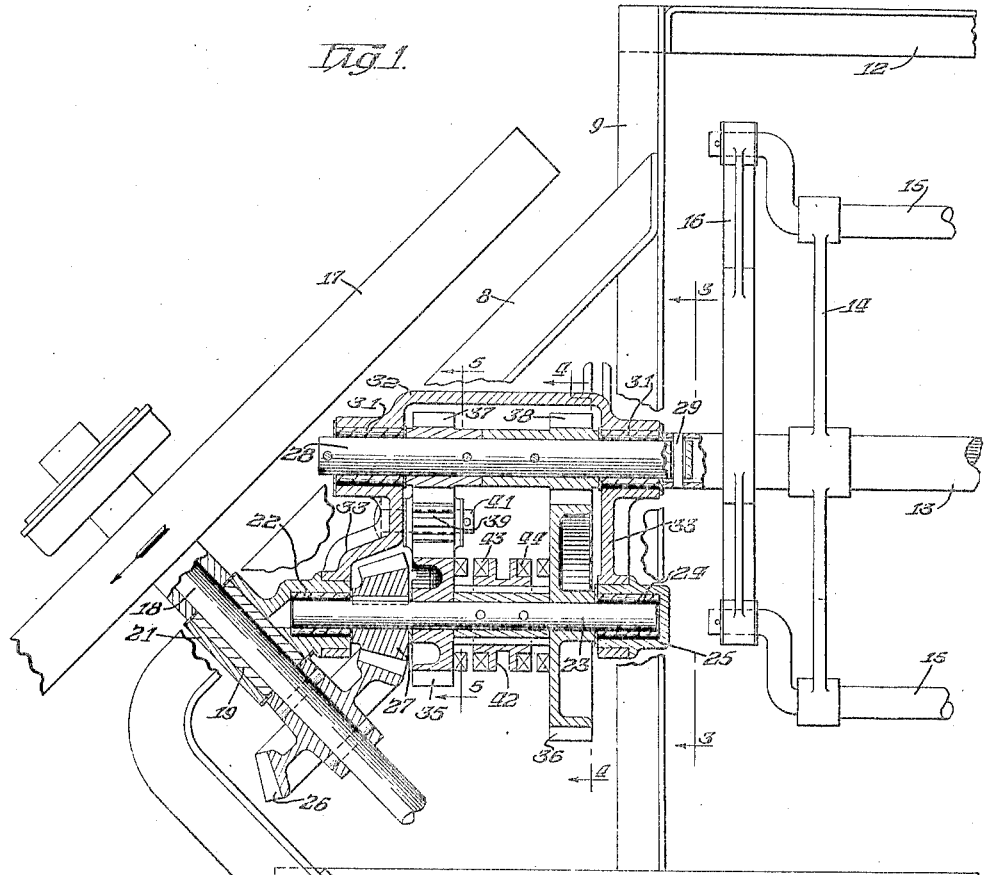
Inventor
Harry R. Traphagen
By Ira J. Wilson
                Atty.

Nov. 4, 1924.                                                              1,513,774
                          H. R. TRAPHAGEN
                          SIDE DELIVERY RAKE
                       Filed March 28, 1922            2 Sheets-Sheet 2
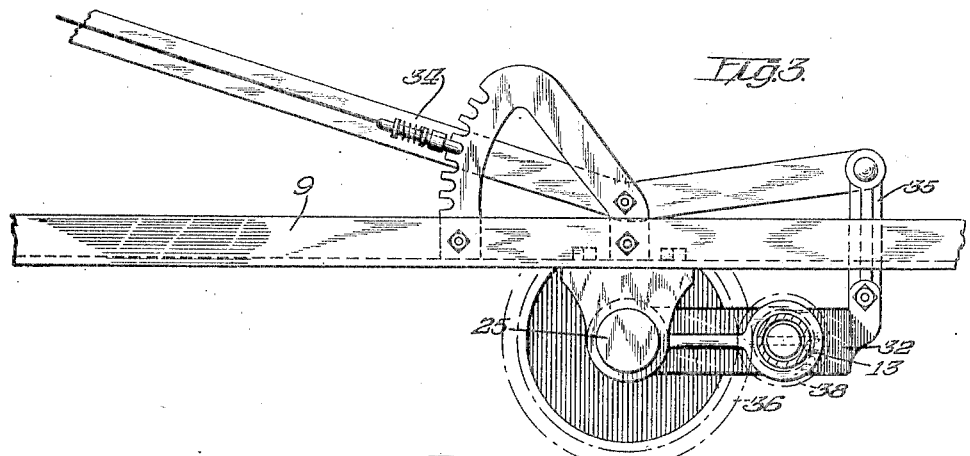
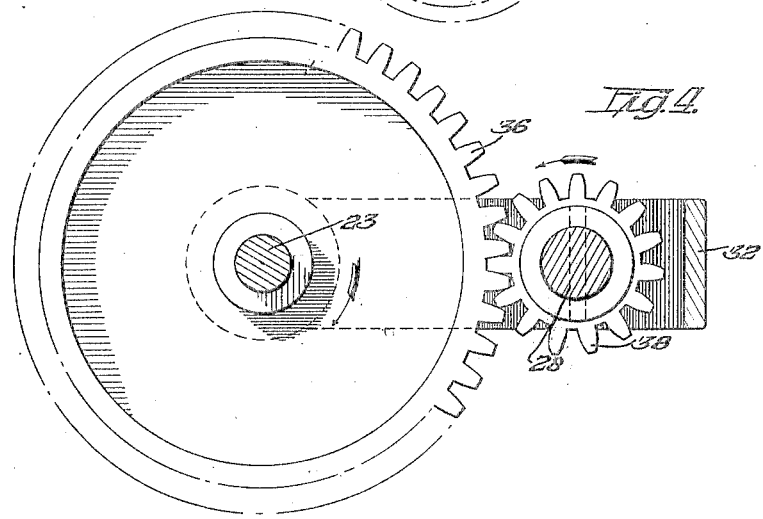
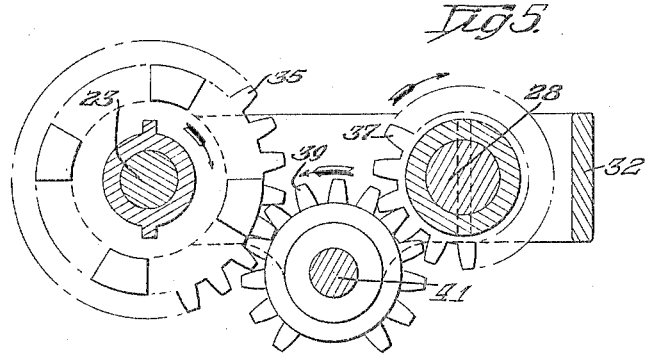

Patented Nov. 4, 1924.

1,513,774

UNITED STATES PATENT OFFICE.

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

SIDE-DELIVERY RAKE.

Application filed March 28, 1922. Serial No. 547,568.

*To all whom it may concern:*

Be it known that I, HARRY R. TRAPHAGEN, a citizen of the United States, residing at Rockford, in the county of Winnebago and State of Illinois, have invented certain new and useful Improvements in Side-Delivery Rakes, of which the following is a specification.

This invention relates to side delivery rakes of the well known class in which a diagonally disposed rotary rake head or reel is adapted to be revolved in one direction for raking and in the opposite for tedding.

It is common practice in this art to drive the reel from the main axle, and various mechanism has been employed for this purpose. It is desired that this mechanism shall permit quick and easy reversal of drive for converting the implement from a side delivery rake to a tedder, also that it shall permit of vertical adjustment of the reel with respect to the frame for raking closer or coarser as the case may require. The present invention pertains to mechanism of this character, and the primary object is to generally improve the construction with the view to promoting lightness in weight, economy in manufacture and durability.

More particularly, my invention contemplates a novel system of gearing between the supporting wheel axle and the rotary reel by means of which rotary motion may be transmitted from the axle to the reel in opposite directions at different speeds, and which permits of the vertical reel adjustment above referred to. This system of gearing promotes economy as it enables the use of relatively smaller gears of ample strength to carry the load requirements. Such gearing is also supported in a novel manner tending toward simplicity and permitting of the desired vertical adjustment of the reel.

Other objects and attendant advantages will be appreciated as the invention becomes better understood by reference to the following description when considered in connection with the accompanying drawings, in which—

Figure 1 is a fragmentary plan view partly in horizontal section of the forward drive end of a side delivery rake;

Fig. 2 is a fragmentary top view of the driving mechanism;

Fig. 3 is a section taken substantially on the line 3—3 of Fig. 1; and

Figs. 4 and 5 are enlarged sections taken substantially on the lines 4—4 and 5—5, respectively of Fig. 1.

In the drawings I have shown only such parts of a side delivery rake as are necessary for a clear understanding of the present invention. It will be understood that except for the features hereinafter claimed, a rake embodying my invention may be of any suitable or preferred construction. In the present instance, I have shown but one end of the main frame composed of a front angle bar 7 having a rearwardly turned end 8 secured to an angle bar 9 which in turn is secured at its front end to the bar 7 and constitutes the forward end of the reel-supporting portion of the frame. Front and rear diagonally disposed frame bars 11 and 12 respectively are rigidly united to the frame structure described and extend rearwardly for supporting the rear end of the reel. The rotary reel may be of any suitable or preferred construction, and in the present case comprises a reel shaft 13, a spider 14 carrying the forward ends of the tooth bars 15 and an eccentric spider 16 on the reel shaft connected with the cranked ends of the toothed bars for causing the teeth to move through an elliptical path as is desired in machines of this class. A supporting wheel 17 carries and is in driving connection with the axle 18 which is journaled on the frame as will be presently described. The foregoing parts are common and well known and in themselves form no part of the present invention.

My invention consists, however, in the provision of novel mechanism operative between a driving shaft, which may be the axle 18, and the reel for rotating the latter forwardly and backwardly at the desired speeds. It also comprehends the provision of novel means for raising and lowering the reel with respect to the frame. In the present embodiment of my invention, I journal the axle 18 in a bearing 19 which is carried by a bracket 21, in turn fixedly bolted to the main frame. This bracket 21 also carries a bearing 22 in which is journaled one end of a counter-shaft 23, the opposite end being journaled in a bearing 24 carried by a bracket 25 which is fixedly bolted to the member 9 of the frame. The counter-shaft 23 journaled in bearings supported in fixed relation to the main frame is in constant driving connection with the axle 18 through the agency of bevel gears 26 and 27, fixed respectively to said axle and shaft. Gearing is now provided between the counter-shaft and the reel for transmitting rotary motion to the latter in opposite directions and preferably at different speeds, as it is desired that the tedding speed shall be higher than the raking. In this regard, my invention comprehends two trains of gears, one for raking and the other for tedding, which shall always be in mesh, a clutch for rendering either train of gearing operative, and means for adjusting certain gears of said trains together with the reel for changing the elevation of the latter without disturbing the operative relation of the gears. To this end, I have in the present example provided a supplemental reel shaft or reel driving shaft 28 concentric with and having a loose or universal driving connection with the reel shaft 13. In this instance, the shaft 28 fits loose within the tubular shaft 13 and is connected thereto by a diametrical pin 29. A universal coupling is thus established between the shafts 13 and 28 permitting disalignment without impairing the driving connection, for a purpose which will be presently apparent. The reel driving shaft 28 is journaled at its opposite ends in bearings 31 supported in the outer end of a yoke 32, the arms 33 of which are fulcrumed on the brackets 21 and 25. The free end of the yoke 32 may, therefore, be swung vertically about the axis of the counter-shaft 23. For so adjusting the yoke and holding it in any set position, any suitable means may be employed, such for example as a hand lever 34, Fig. 3, connected by means of a link 35 to the yoke 32 and having the usual segment connection with the frame. The gearing between the shafts 23 and 28 consist in the present instance of gears 35 and 36 loose on the shaft 23, gears 37 and 38 fixed to the shaft 28, the gear 38 being in mesh with the gear 36 and the gear 37 being in mesh with an intermediate gear 39 journaled on a stub shaft 41 on the yoke and meshing with the gear 35. By means of a suitable clutch, either train of gearing may be connected to the shaft 23 and for this purpose I employ a shiftable clutch element 42 having clutch teeth 43 and 44 adapted to respectively engage complemental clutch teeth on the gears 35 and 36. Suitable means such as a lever 45 may be employed for shifting the clutch, the lever having a forked end connected with the clutch element and an operating end adapted to be located in any of the notches 46, 47 and 48 in the frame member 11 for holding such clutch element in neutral or either operative position.

Referring now to the operation, it will be manifest that when the parts are in the position shown in Fig. 1, the rake may be transported without rotating the reel, by reason of the fact that the driving train between the axle 18 and the reel is broken by the clutch element 42. In the event that it is desired to employ the rake for tedding, the lever 45 will be shifted to the left, thereby engaging the clutch teeth 44 and transmitting the drive from the shaft 23 to the shaft 28 through the gears 36 and 38, the lever 45 being held in this operated position by its engagement in the notch 46. It will be manifest that in this operated position the bottom of the reel will turn backwardly and upwardly for tedding purposes. By shifting the lever 45 into engagement with the notch 49, the tedding gears will be disconnected from the shaft 23 and the clutch teeth 43 will connect the train of gears 35, 37 and 39 with the counter-shaft, thereby causing the reel to be rotated in the reverse direction and at a slower speed for raking. Attention is now directed to the construction which permits of vertical adjustment of the forward end of the reel at any time without disturbing the operative relation of the gearing. This adjustment may be quickly and easily effected by operation of the lever 34 to position the rake teeth in the desired proximity to the ground. By operation of the lever 34, the rear end of the yoke 32 may be raised and lowered, thereby correspondingly moving the shaft 28, the reel shaft 13 and parts connected therewith. Inasmuch as the shaft 28 is journaled at its opposite ends in a rigid frame, there are no torsional strains set up or any displacement of the gearing such as might impair the life or efficiency of the parts. The universal coupling between the reel shaft 13 and its driving shaft 28 compensates for any disalignment caused by such vertical adjustment. By reason of the system of gearing shown, relatively small gears may be employed and the gearing between the shafts 23 and 28 may be considerably lighter than the bevel gears 26 and 27. Such system of gearing also promotes compactness and reduction of parts to minimum size and weight consistent with the work to be performed. The drive is transmitted directly through simple gearing supported on shafts journaled in roller bearings, thereby reducing frictional resistance to a minimum.

It is believed that the foregoing conveys a clear understanding of the objects prefaced above, and while I have illustrated but a single working embodiment, it should be understood that changes might be made in details of construction without departing from the spirit and scope of the invention as explained in the appended claims.

I claim:

1. In a side delivery rake, the combination of supporting wheels, an axle carried thereby, a frame on the axle, a diagonally disposed reel shaft, a reel driving shaft at the forward end of and concentric with said reel shaft, a universal connection between the reel driving shaft and the reel shaft, a counter-shaft parallel with the reel driving shaft, gearing between said counter-shaft and reel driving shaft, and bevel gears connecting said counter-shaft and axle.

2. In a side delivery rake, the combination of supporting wheels, an axle carried thereby, a frame on the axle, a diagonally disposed reel shaft, a reel driving shaft at the forward end of and concentric with said reel shaft, a universal connection between the reel driving shaft and the reel shaft, a counter-shaft parallel with the reel driving shaft, gearing between said counter-shaft and reel driving shaft, bevel gears connecting said counter-shaft and axle, bearings for the counter-shaft mounted upon and in fixed relation to the frame, bearings for the reel driving shaft, and means for vertically adjusting the last mentioned bearings with respect to the frame.

3. In a side delivery rake, the combination of supporting wheels, an axle carried thereby, a frame on the axle, a diagonally disposed reel shaft, a reel driving shaft at the forward end of and concentric with said reel shaft, a universal connection between the reel driving shaft and the reel shaft, a counter-shaft parallel with the reel driving shaft, gearing between said counter-shaft and reel driving shaft, bevel gears connecting said counter-shaft mounted upon and in fixed relation to the frame, bearings for the reel driving shaft, a yoke carrying the last mentioned bearings and pivotally mounted to swing about the axis of the first mentioned bearings, and means for vertically adjusting the free end of said yoke with respect to the frame and for holding it in any adjusted position.

4. In a side delivery rake, the combination with a frame and a diagonally disposed reel shaft, of a driving shaft at right angles to the line of draft, a reel driving shaft at the forward end of and universally connected to said reel shaft, a counter-shaft parallel with said reel driving shaft and disposed intermediate the latter and the driving shaft, gearing between the driving shaft and the counter-shaft and between the latter and the reel driving shaft, including a clutch on the counter-shaft, and means for vertically adjusting the reel driving shaft with respect to the frame without disturbing the operative relation of said gearing.

5. In a side delivery rake, the combination with a wheel-supported frame and a diagonally disposed reel shaft, of a driving shaft on the frame at right angles to the line of draft, a counter-shaft on the frame parallel with the reel shaft, a bevel gear connection between the driving shaft and the counter-shaft, raking and tedding gearing between the counter-shaft and the reel shaft, a clutch for connecting either the raking or tedding gearing with the reel shaft, said gearing including gears concentric with the reel shaft, and means for vertically adjusting the last mentioned gears with respect to the frame without disturbing their operative relation with their complemental gears.

6. In a side delivery rake, the combination with a main frame, a supporting wheel axle thereon and a diagonally disposed reel shaft, a counter-shaft parallel with the reel shaft and journaled in bearings supported on the frame in fixed relation thereto, gearing between the axle and counter-shaft, a raking and a tedding train of gearing between the counter-shaft and the reel shaft, a clutch for connecting either train of gearing with the reel shaft, and means for vertically adjusting the reel shaft with respect to the frame without disturbing the operative relation of said gearing.

7. In a rotary rake, the combination with a wheel-supported frame and a rotary reel thereon, of a reel driving shaft concentric with the rotary reel, a countershaft parallel with the reel driving shaft, a raking and a tedding train of gearing between said shafts, a clutch on the counter-shaft adapted to connect either train thereto, means for driving said counter-shaft, and means for raising and lowering the reel driving shaft and the adjacent end of the reel with respect to the frame.

8. In a rotary rake, the combination with a wheel-supported frame and a rotary reel, of a reel driving shaft in driving connection with the reel, a counter-shaft journaled in bearings supported upon and in fixed relation to the frame, gearing between the counter-shaft and reel driving shaft for driving the latter in opposite directions, means for driving the counter-shaft, a yoke carrying bearings for the reel driving shaft, and pivotally mounted concentric with the counter-shaft, and means for vertically adjusting said yoke about the axis of said counter-shaft for raising and lowering said reel with respect to the frame.

9. In a side delivery rake, the combination of a main frame, an axle at right angles to the line of draft, a supporting wheel in driving connection with the axle, a rotary diagonally extending reel, a reel driving shaft at the front end of and concentric with said reel and having a universal connection therewith, a counter-shaft parallel with the reel driving shaft and disposed intermediate the latter and the axle, a bracket fixed to the main frame and carrying a bearing for the axle and the adjacent end of the counter-shaft, a second bracket fixed to the main frame and carrying a bearing for the opposite end of the counter-shaft, bevel gears connecting the axle and the counter-shaft, trains of gearing between the counter-shaft and reel driving shaft adapted for driving the latter in opposite directions, a clutch on the countershaft for connecting either train of gearing thereto, a yoke journaled on said brackets and carrying bearings in which the reel driving shaft is journaled, and means for raising and lowering the free end of the yoke with respect to the frame to raise and lower the reel.

10. In a side delivery rake, the combination of a wheel-supported frame, a diagonally disposed reel, and gearing for driving the reel including gears or a fixed axis on said frame and gears vertically adjustable with respect thereto and universally connected to the reel.

HARRY R. TRAPHAGEN.